United States Patent [19]

Model et al.

[11] 4,043,999
[45] Aug. 23, 1977

[54] METHYL OR METHOXY SUBSTITUTED IMINOISOINDOLINONE PIGMENTS

[75] Inventors: Ernst Model, Basel; André Pugin, Riehen, both of Switzerland

[73] Assignee: Ciba-Geigy Corporation, Ardsley, N.Y.

[21] Appl. No.: 663,329

[22] Filed: Mar. 3, 1976

Related U.S. Application Data

[63] Continuation-in-part of Ser. No. 287,314, Sept. 8, 1972, abandoned.

[30] Foreign Application Priority Data

Sept. 27, 1971 Switzerland .................. 14052/71

[51] Int. Cl.$^2$ ............................................. C09B 43/00
[52] U.S. Cl. ................................... 260/152; 260/165
[58] Field of Search ............................ 260/152, 165

[56] References Cited

U.S. PATENT DOCUMENTS 2,973,358  2/1961  Pugin .................. 260/165 X

*Primary Examiner*—Charles F. Warren
*Attorney, Agent, or Firm*—Vincent J. Cavalieri

[57] ABSTRACT

Iminoisoindolinone dyestuffs of the formula

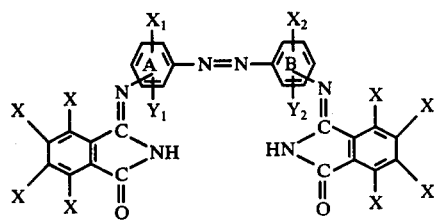

wherein X denotes chlorine or bromine atoms, $X_1$ denotes a halogen atom or an alkyl, alkoxy, nitrile, trifluoromethyl or alkylsulphonyl group, $Y_1$ denotes a hydrogen or halogen atom or an alkyl or alkoxy group, $X_2$ denotes a hydrogen or halogen atom or an alkyl or alkoxy group and $Y_2$ denotes a hydrogen or halogen atom or an alkyl or alkoxy group, or the radicals $X_2$ and $Y_2$ together form a fused benzene ring, and wherein, in the benzene rings A and B, a hydrogen atom is present in at least one o-position relative to the azomethine group were prepared. The dyestuffs may be used for pigmenting high molecular weight organic materials such as cellulose ethers, polyamides and polyesters. The pigments have outstanding fastness to light, migration and weathering.

3 Claims, No Drawings

METHYL OR METHOXY SUBSTITUTED IMINOISOINDOLINONE PIGMENTS

This is a continuation-in-part of our copending application Ser. No. 287,314 filed Sept. 8, 1972 now abandoned.

It has been found that new, valuable iminoisoindolinone dyestuffs of the formula

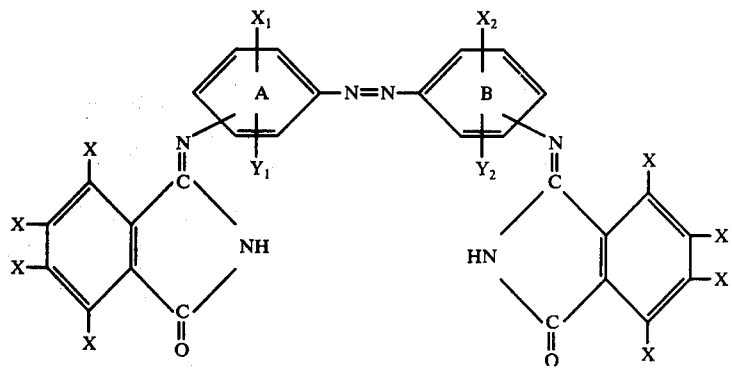

wherein X denotes chlorine or bromine atoms, $X_1$ denotes a halogen atom or an alkyl, alkoxy, nitrile, trifluoromethyl or alkylsulphonyl group, $Y_1$ denotes a hydrogen or halogen atom or an alkyl or alkoxy group, $X_2$ denotes a hydrogen or halogen atom or an alkyl or alkoxy group and $Y_2$ denotes a hydrogen or halogen atom or an alkyl or alkoxy group, or the radicals $X_2$ and $Y_2$ together form a fused benzene ring, and wherein, in the benzene rings A and B, a hydrogen atom is present in at least one o-position relative to the azomethine group, are obtained if an azo compound of the formula

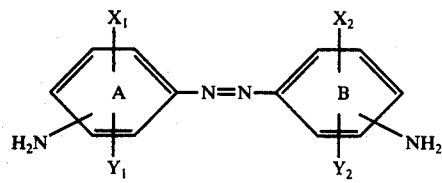

wherein $X_1$, $Y_1$, $X_2$ and $Y_2$ have the indicated meaning, is condensed in a molar ratio of 1:2 with a 4,5,6,7-tetrahalogenoisoindolinone-1 which contains, in the 3-position, easily replaceable substituents which, depending on the type or number, require two bonds and are more mobile than the oxygen located in the 1-position.

The dyestuffs according to the invention preferably correspond to the formula

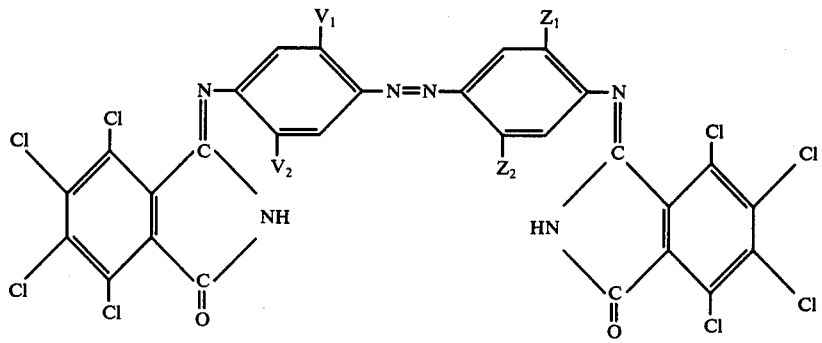

wherein $V_1$ and $V_2$ denote hydrogen or halogen atoms, or alkyl or alkoxy groups containing 1 to 4 carbon atoms and $Z_1$ and $Z_2$ denote hydrogen atoms or alkyl or alkoxy groups containing 1 to 4 carbon atoms, with at least one of the substituents $V_1$ and $Z_2$ denoting an alkyl or alkoxy group.

Examples of starting substances used are 4,5,6,7-tetrabromo-isoindolinones, but preferably 4,5,6,7-tetrachloroisoindolinones. As easily replaceable substituents in the 3-position they contain, for example, two halogen atoms, especially chlorine atoms, two tertiary amino groups, for example piperidino or morpholino groups, an imino group or a thioxo group or, in particular, 2 alkoxy groups, preferably those containing 1 to 4 carbon atoms, especially methoxy groups. These starting substances are known.

The azo compounds preferably used are those of the formula

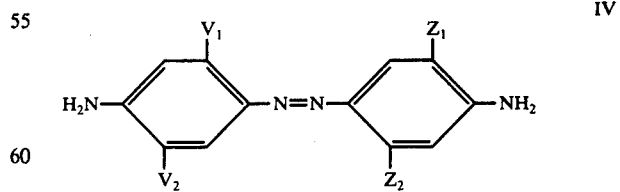

wherein $V_1$ and $V_2$ denote hydrogen or halogen atoms or alkyl or alkoxy groups containing 1 to 4 carbon atoms, $Z_1$ and $Z_2$ denote hydrogen atoms or alkyl or alkoxy groups containing 1 to 4 carbon atoms, with at least one of the substituents $V_1$ and $Z_2$ denoting an alkyl or alkoxy group.

The diazoamino compounds used are known substances which are obtained, for example, by coupling the diazo compound of a monoacylated diaminobenzene with an aminobenzene and deacylating the resulting azo dyestuff, or by coupling the diazo compound of a nitroaniline with an aminobenzene and reducing the nitro group in the resulting azo dyestuff. The following diaminoazo compound may be mentioned as examples: 2-chloro-4,4'-diaminoazobenzene, 3-chloro-4,4'-diaminoazobenzene, 2-methyl-4,4'-diaminoazobenzene, 3-methyl-4,4'-diaminoazobenzene, 2-methoxy-4,4'-diaminoazobenzene, 3-methoxy-4,4'-diaminoazobenzene, 2,5-dimethyl-4,4'-diaminoazobenzene, 2,3-dimethyl-4,4'-diaminoazobenzene, 5,2',5'-trimethyl-4,4'-diaminoazobenzene, 2,5-2'-trimethyl-4,4'-diaminoazobenzene, 2,5,2',5'-tetramethyl-4,4'-diaminoazobenzene, 3-methyl-2'-methoxy-4,4'-diaminoazobenzene, 2-chloro-2'-methyl-4,4'-diaminoazobenzene, 3-chloro-2'-methyl-4,4'-diaminoazobenzene, 3-chloro-5-2'-dimethyl-4,4'-diaminoazobenzene, 2-chloro-5-2'-dimethyl-4,4'-diaminoazobenzene, 3-chloro-5-2'-dimethoxy-4,4'-diaminoazobenzene, 3-chloro-2',5'-diethoxy-4,4'-diaminoazobenzene, 2,5-dimethyl-2'-methoxy-4,4'-diaminoazobenzene, 2,5-dimethyl-2'-methyl-5'-methoxy-4,4'-diaminoazobenzene, 2,5-dimethyl-2',5'-dimethoxy-4,4'-diaminoazobenzene, 2,5,2',5'-tetramethoxy-4,4'-diaminoazobenzene, 2,5,2',5'-tetraethoxy-4,4'-diaminoazobenzene, 2,5-diethoxy-2'-methoxy-4,4'-diaminoazobenzene, 2,5,5'-trimethoxy-2'-methyl-4,4'-diaminoazobenzene, 2-cyano-4,4'-diaminoazobenzene, 2-cyano-2'-methyl-4,4'-diaminoazobenzene, 2-cyano-2',5'-dimethyl-4,4'-diaminoazobenzene, 2-cyano-2'-methyl-5'-methoxy-4,4'-diaminoazobenzene, 2-cyano-2',5'-dimethoxy-4,4'-diaminoazobenzene, 2-trifluoromethyl-4,4'-diaminoazobenzene, 2-trifluoromethyl-2'-methyl-4,4'-diaminoazobenzene, 2-trifluoromethyl-2',5'-dimethyl-4,4'-diaminoazobenzene, 2-trifluoromethyl-2'-methyl-5'-methoxy-4,4'-diaminoazobenzene, 2-methylsulphonyl-4,4'-diaminoazobenzene, 2-methylsulphonyl-2'-methyl-4,4'-diaminoazobenzene, 2-methylsulphonyl-2',5'-dimethyl-4,4'-diaminoazobenzene, 2-methylsulphonyl-2'-methyl-5'-methoxy-4,4'-diaminoazobenzene, 4-chloro-3,4'-diaminoazobenzene, 2-chloro-4,3'-diaminoazobenzene, 2-methyl-4,3'-diaminoazobenzene, 2-methoxy-4,3'-diaminoazobenzene and 4,4'-diaminobenzene-1-azonaphthalene-1'.

The condensation in part already takes place cold but, if necessary, with warming of the intimately mixed components and particularly advantageously in the presence of organic solvents which are inert, that is to say which do not participate in the reaction.

If starting from 3-imino-, 3-thioxo- or 3,3-bis-tert. amino-4,5,6,7-tetrachloroisoindolin-1-ones or from alkali salts of the 3,3-dialkoxy-4,5,6,7-tetrachloroisoindolin-1-ones, organic solvents which are miscible with water, for example lower aliphatic alcohols, such as lower alkanols, for example methanol, isopropanol or butanol, lower cyclic ethers, such as dioxane or ethylene glycol monomethyl ether or lower aliphatic ketones, such as acetone, are advantageously used. In this case the condensation already takes place at relatively low temperatures. It is advantageously carried out in the presence of agents which bind bases; as examples of such, lower fatty acids, which then simultaneously act as solvents, especially acetic acid, may be mentioned.

If using 3,3-dihalogeno-4,5,6,7-tetrachloroisoindolin-1-ones, organic solvents which are free of hydroxyl groups are preferred, such as hydrocarbons, for example aromatic hydrocarbons, such as benzene, toluene, xylene, tetrahydronaphthalene or diphenyl, or cycloaliphatic hydrocarbons, for example cyclohexane, and also halogenated hydrocarbons, such as aliphatic halogenated hydrocarbons, for example carbon tetrachloride or tetrachloroethylene, or aromatic halogenated hydrocarbons, such as chlorobenzene or dichlorobenzenes and trichlorobenzenes, and also aromatic nitrohydrocarbons, such as nitrobenzene, ethers, namely aliphatic ethers, such as dibutyl ether, aromatic ethers, such as diphenyl ether, or cyclic ethers, such as dioxane, and also ketones, such as acetone, or esters, especially esters of lower fatty acids with lower alkanols, such as acetic acid ethyl ester, in the presence of acid-binding agents.

Immediately after its formation, the new pigment precipitates from the reaction medium. It can be directly used as a crude pigment for certain purposes; it can however also be improved yet further in its properties, especially as regards purity, form and covering power, in accordance with methods which are in themselves known, for example by extraction with organic solvents or by grinding with grinding auxiliaries which can subsequently be removed again, for example salt.

The new dyestuffs are valuable pigments which, in a finely divided form, can be used for pigmenting high molecular organic material, for example cellulose ethers and cellulose esters, such as ethylcellulose, acetylcellulose or nitrocellulose, polyamides, polyurethanes or polyesters, natural resins or synthetic resins, for example aminoplasts, and especially thermoplastic and thermosetting acrylic resins, urea-formaldehydes and melamine-formaldehyde resins and also alkyd resins, phenoplasts, polycarbonates, polyolefines, such as polystyrene, polyvinyl chloride, polyethylene, polypropylene, polyacrylonitrile, polyacrylic acid ester, rubber, casein, silicone and silicone resins, individually or as mixtures. Here it does not matter whether the high molecular compounds mentioned are present as plastic masses or melts or in the form of spinning solutions, lacquers, paints or printing inks. Depending on the end use, it proves advantageous to employ the new pigments as toners or in the form of preparations. The new pigments are distinguished by high fastness properties, especially by outstanding fastness to light, migration weathering and heat, a high tinting strength and good dispersability.

The present invention permits economical and ecologically unobjectionable manufacture of very fast strongly coloured orange pigments.

EXAMPLE 1

A hot solution of 5.65 g of 2-methyl-4,4'-diaminoazobenzene in 200 ml of 1,2-dichlorobenzene is added to a solution of 17 g of 3,3,4,5,6,7-hexachloroisoindolin-1-one in 100 ml of 1,2-dichlorobenzene. An orange-yellow precipitate immediately forms. The suspension is heated to 160°–170° C whilst stirring and is kept thereat for 2 hours.

The insoluble pigment is filtered off at 130° C and washed with methanol, acetone and water. After drying, 14 g of an orange-yellow powder are obtained which can be used directly, in this form, for dyeing plastics and for incorporation into lacquers. The dyeings thereby obtained are distinguished by excellent fastness properties.

EXAMPLE 2

18.2 g of 4,5,6,7-tetrachloro-3,3-dimethoxy-isoindolin-1-one and 55 ml of 1 N sodium methylate solution are dissolved in methanol. 6.8 g of 2,5-dimethoxy-4,4'-diaminoazobenzene and 100 ml of 1,2-dichlorobenzene are now added. The temperature is raised to 100° C whilst distilling off methanol and stirring well, whereupon a clear solution is transiently produced and the sodium salt of the pigment subsequently separates out. After adding a further 100 ml of 1,2-dichlorobenzene and 20 ml of glacial acetic acid, the temperature is raised to 140° – 145° C and the mixture is stirred for 2 hours at this temperature. The pigment which precipitates is filtered off at 120° C, washed with alcohol, acetone and water and dried in vacuo at 70° C. 17 g of a red pigment are obtained which, when incorporated into printing pastes, yields printing of very good fastness to light.

EXAMPLE 3

16.5 g of 3,4,5,6-tetrachlorocyanobenzoic acid methyl ester and 55 ml of a 1 N sodium methylate solution in methanol are stirred to give a clear solution. The sodium salt of 3,3-dimethoxy-4,5,6,7-tetrachloroisoindolin-1-one is produced. 6.05 g of 2-methoxy-4,4'-diaminoazobenzene and 100 ml of o-dichlorobenzene are now added whilst stirring well. The temperature is now raised to 100° C whilst methanol distils off. A homogeneous solution is transiently produced and thereafter the sodium salt of the pigment separates out. The mixture is diluted with a further 100 ml of o-dichlorobenzene and acidified with 20 ml of glacial acetic acid and the temperature is raised to 140° – 145° C and kept thereat for 2 hours, whilst stirring well. The insoluble pigment is filtered off at 120° C and washed with methanol, acetone and water. After drying, 17.6 g of a strongly coloured reddish-tinged orange pigment are obtained which can be used directly, in this form, for dyeing plastics and for the manufacture of printing pastes and coloured lacquers. The dyeings thereby produced are distinguished by excellent fastness properties.

If instead of 3,4,5,6-tetrachlorocyanobenzoic acid methyl ester equimolecular amounts of 3,4,5,6-tetrabromocyanobenzoic acid methyl ester (melting point 122° to 124° C) are used and the indicated procedure is followed, an orange pigment is obtained which gives dyeings of excellent fastness to light when incorporated into plastics.

If 2-methoxy-4,4'-diaminoazobenzene is replaced by corresponding amounts of the diaminoazobenzenes listed below, pigments with similarly good properties are obtained:

Table-continued

| Ex. No. | Structure | Color |
|---|---|---|
| 18 | 4-NH$_2$-3-OCH$_3$-C$_6$H$_3$—N=N—2-OC$_2$H$_5$-4-NH$_2$-5-OC$_2$H$_5$-C$_6$H$_2$ | bluish-tinged red |
| 19 | 4-NH$_2$-3-OCH$_3$-C$_6$H$_3$—N=N—3-OCH$_3$-4-NH$_2$-C$_6$H$_3$ | yellow-orange |
| 20 | 4-NH$_2$-3-CH$_3$-C$_6$H$_3$—N=N—2-CH$_3$-4-NH$_2$-5-CH$_3$-C$_6$H$_2$ | brownish-tinged orange |
| 21 | 4-NH$_2$-3-CH$_3$-C$_6$H$_3$—N=N—2-OCH$_3$-4-NH$_2$-5-CH$_3$-C$_6$H$_2$ | yellow |
| 22 | 4-NH$_2$-3-Cl-C$_6$H$_3$—N=N—3-CH$_3$-4-NH$_2$-C$_6$H$_3$ | yellow-orange |
| 23 | 4-NH$_2$-3-Cl-C$_6$H$_3$—N=N—3-OCH$_3$-4-NH$_2$-C$_6$H$_3$ | orange |
| 24 | 4-NH$_2$-3-Cl-C$_6$H$_3$—N=N—2-CH$_3$-4-NH$_2$-5-CH$_3$-C$_6$H$_2$ | yellow |
| 25 | 4-NH$_2$-3-Cl-C$_6$H$_3$—N=N—2-OCH$_3$-4-NH$_2$-5-OCH$_3$-C$_6$H$_2$ | orange |
| 26 | 4-NH$_2$-3-Cl-C$_6$H$_3$—N=N—2-OC$_2$H$_5$-4-NH$_2$-5-OC$_2$H$_5$-C$_6$H$_2$ | reddish-tinged orange |
| 27 | 4-NH$_2$-2-CH$_3$-5-CH$_3$-C$_6$H$_2$—N=N—3-OCH$_3$-4-NH$_2$-C$_6$H$_3$ | brown |
| 28 | 4-NH$_2$-2-CH$_3$-5-CH$_3$-C$_6$H$_2$—N=N—2-CH$_3$-4-NH$_2$-5-CH$_3$-C$_6$H$_2$ | yellow-orange |
| 29 | 4-NH$_2$-2-CH$_3$-5-CH$_3$-C$_6$H$_2$—N=N—2-OCH$_3$-4-NH$_2$-5-CH$_3$-C$_6$H$_2$ | brownish-tinged orange |
| 30 | 4-NH$_2$-2-CH$_3$-5-CH$_3$-C$_6$H$_2$—N=N—2-OCH$_3$-4-NH$_2$-5-OCH$_3$-C$_6$H$_2$ | reddish-tinged brown |
| 31 | 4-NH$_2$-2-OCH$_3$-5-OCH$_3$-C$_6$H$_2$—N=N—2-OCH$_3$-4-NH$_2$-5-OCH$_3$-C$_6$H$_2$ | brownish-tinged red |
| 32 | 4-NH$_2$-2-OCH$_3$-5-OCH$_3$-C$_6$H$_2$—N=N—2-OCH$_3$-4-NH$_2$-5-CH$_3$-C$_6$H$_2$ | maroon |
| 33 | 4-NH$_2$-2-OCH$_3$-5-OCH$_3$-C$_6$H$_2$—N=N—2-OCH$_3$-4-NH$_2$-5-OCH$_3$-C$_6$H$_2$ | violet/maroon |
| 34 | 4-NH$_2$-2-OC$_2$H$_5$-5-OC$_2$H$_5$-C$_6$H$_2$—N=N—3-OCH$_3$-4-NH$_2$-C$_6$H$_3$ | red |
| 35 | 4-NH$_2$-2-OC$_2$H$_5$-5-OC$_2$H$_5$-C$_6$H$_2$—N=N—2-OC$_2$H$_5$-4-NH$_2$-5-OC$_2$H$_5$-C$_6$H$_2$ | claret |
| 36 | 3-H$_2$N-C$_6$H$_4$—N=N—2-OCH$_3$-4-NH$_2$-5-OCH$_3$-C$_6$H$_2$ | brown |

EXAMPLE 37

2 g of the pigment manufactured according to Example 2 are ground with 36 g of hydrated alumina, 60 g of linseed oil varnish of medium viscosity and 0.2 g of cobalt linoleate on a triple-roll mill. The red prints produced with the resulting colour paste are strongly coloured and of excellent fastness to light.

EXAMPLE 38

0.6 g of the pigment manufactured according to Example 3 are mixed with 67 g of polyvinyl chloride, 33 g of dioctyl phthalate, 2 g of dibutyl-tin dilaurate and 2 g of titanium dioxide and processed on a mill for 15 minutes at 160° C to give a thin film. The reddish-tinged orange dyeing thus produced is strongly coloured and fast to migration, heat and light.

EXAMPLE 39

10 g of titanium dioxide and 2 g of the pigment manufactured according to Example 3 and listed under 6 in the table are ground with 88 g of a mixture of 26.4 g of coconut alkyd resin, 24.0 g of melamine-formaldehyde resin (50% solids content), 8.8 g of ethylene glycol monomethyl ether and 28.8 g of xylene for 48 hours in a ball mill.

If this lacquer is sprayed onto an aluminium foil, pre-dried for 30 minutes at room temperature and then stoved for 30 minutes at 120° C, an orange lacquering is obtained which is distinguished by very good fastness to overlacquering, light and weathering, coupled with good colour strength.

What we claim is:
1. A compound of the formula

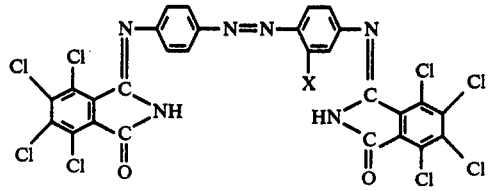

wherein X is methyl or methoxy.

2. The compound according to claim 1 of the formula

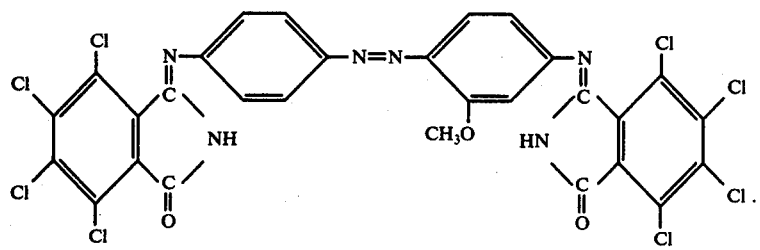

3. The compound according to claim 1 of the formula

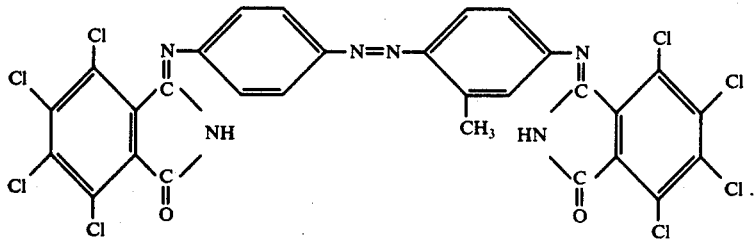

* * * * *